United States Patent
Poulo

(10) Patent No.: US 10,078,340 B2
(45) Date of Patent: Sep. 18, 2018

(54) MICRO CHANNEL DEVICE TEMPERATURE CONTROL

(75) Inventor: Louis Poulo, Andover, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 1391 days.

(21) Appl. No.: 12/748,782

(22) Filed: Mar. 29, 2010

(65) Prior Publication Data
US 2011/0232892 A1    Sep. 29, 2011

(51) Int. Cl.
*G05D 23/00* (2006.01)
*G05D 23/19* (2006.01)

(52) U.S. Cl.
CPC .................... *G05D 23/19* (2013.01)

(58) Field of Classification Search
CPC . G05D 23/19; B01L 3/508; B01L 7/52; B01L 3/50857; B01L 7/02; B01L 2200/025; B01L 2200/0684; B01L 2200/0689; B01L 2300/021; B01L 2300/0636; B01L 2300/0819; B01L 2300/0822; B01L 2300/1822; B01L 2300/1838; B01L 2300/185
USPC ................ 435/287.2; 165/287, 185
See application file for complete search history.

(56) References Cited

U.S. PATENT DOCUMENTS

2006/0094108 A1*   5/2006   Yoder et al. ............... 435/287.2
2009/0226971 A1*   9/2009   Beer et al. ................. 435/91.2

OTHER PUBLICATIONS

Mahjoob, Shadi et. al. "Rapid microfluidic thermal cycler for polymerase chain reaction nucleic acid amplification" (2008) International Journal of Heat and Mass Transfer vol. 51, pp. (2109-2122).*

* cited by examiner

*Primary Examiner* — William H Beisner
*Assistant Examiner* — Danielle B Henkel
(74) *Attorney, Agent, or Firm* — Anthony M. Del Zoppo; Daughrety & Del Zoppo Co., LPA

(57) ABSTRACT

A micro channel device processing apparatus includes a heating/cooling chamber configured to receive at least a sub-portion of a micro channel device and a fluid control system that controls a flow of a heating/cooling fluid in the chamber. A method includes controlling a temperature of a sample carried by a micro channel device installed in a micro channel device processing apparatus via a heating/cooling chamber of the processing apparatus. A micro channel device processing apparatus includes a heating/cooling chamber configured to receive a micro channel device carrying a sample and means for controlling a temperature of the sample in the chamber.

20 Claims, 3 Drawing Sheets

MICRO CHANNEL DEVICE TEMPERATURE CONTROL

TECHNICAL FIELD

The following generally relates to micro channel devices and more particularly to temperature control of a sample carried by a micro channel device.

BACKGROUND

Micro channel devices include, but are not limited to, devices which carry a small volume of a sample for processing and/or analysis. Micro channel devices have been used in biochips, labs-on-a-chip, inkjet printheads, and other micro based technologies. In some instances, a temperature of a sample in a micro channel of a micro channel device is controlled so that it is within a predetermined temperature range for processing, analysis, and/or other purposes. Controlling the temperature includes heating and/or cooling the fluid so that the temperature of the fluid is within the predetermined temperature range.

One technique for heating and/or cooling the fluid involves using a Peltier device, which, generally, is a thermoelectric heat pump that transfers heat from one side of the Peltier device to the other side of the Peltier device. With this technique, the Peltier device is placed in thermal communication with the micro channel device, and an appropriate voltage is applied to the Peltier device to create a temperature gradient for transferring heat between the sides of the Petlier device, either away from or towards the micro channel device. The polarity of the applied voltage determines whether the Peltier device heats up or cools down the micro channel device and thus the sample.

Unfortunately, a Peltier device (or the like) may require good mechanical/thermal contact between the Peltier device and the micro channel device. Such contact may require accurate and precise mechanical alignment and pressure. Moreover, heat transfer via the Peltier device may be non-uniform through conduction through the side of the Peltier device in mechanical contact with the micro channel device. Furthermore, using such a device may increase the thermal mass that participates in thermal cycling, which may increase the power required to implement thermal cycling.

As a consequence, using a Peltier or similar device may increase the overall size of the micro channel device, power consumption and/or dissipation of the micro channel device, and/or the cost of the micro channel device, as well as provide non-uniform and/or relatively slow temperature control.

SUMMARY

Aspects of the application address the above matters, and others.

In one aspect, a micro channel device processing apparatus includes a heating/cooling chamber configured to receive at least a sub-portion of a micro channel device and a fluid control system that controls a flow of a heating/cooling fluid in the chamber.

In another aspect, a method includes controlling a temperature of a sample carried by a micro channel device installed in a micro channel device processing apparatus via a heating/cooling chamber of the processing apparatus.

In another aspect, a micro channel device processing apparatus includes a heating/cooling chamber configured to receive a micro channel device carrying a sample and means for controlling a temperature of the sample in the chamber.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
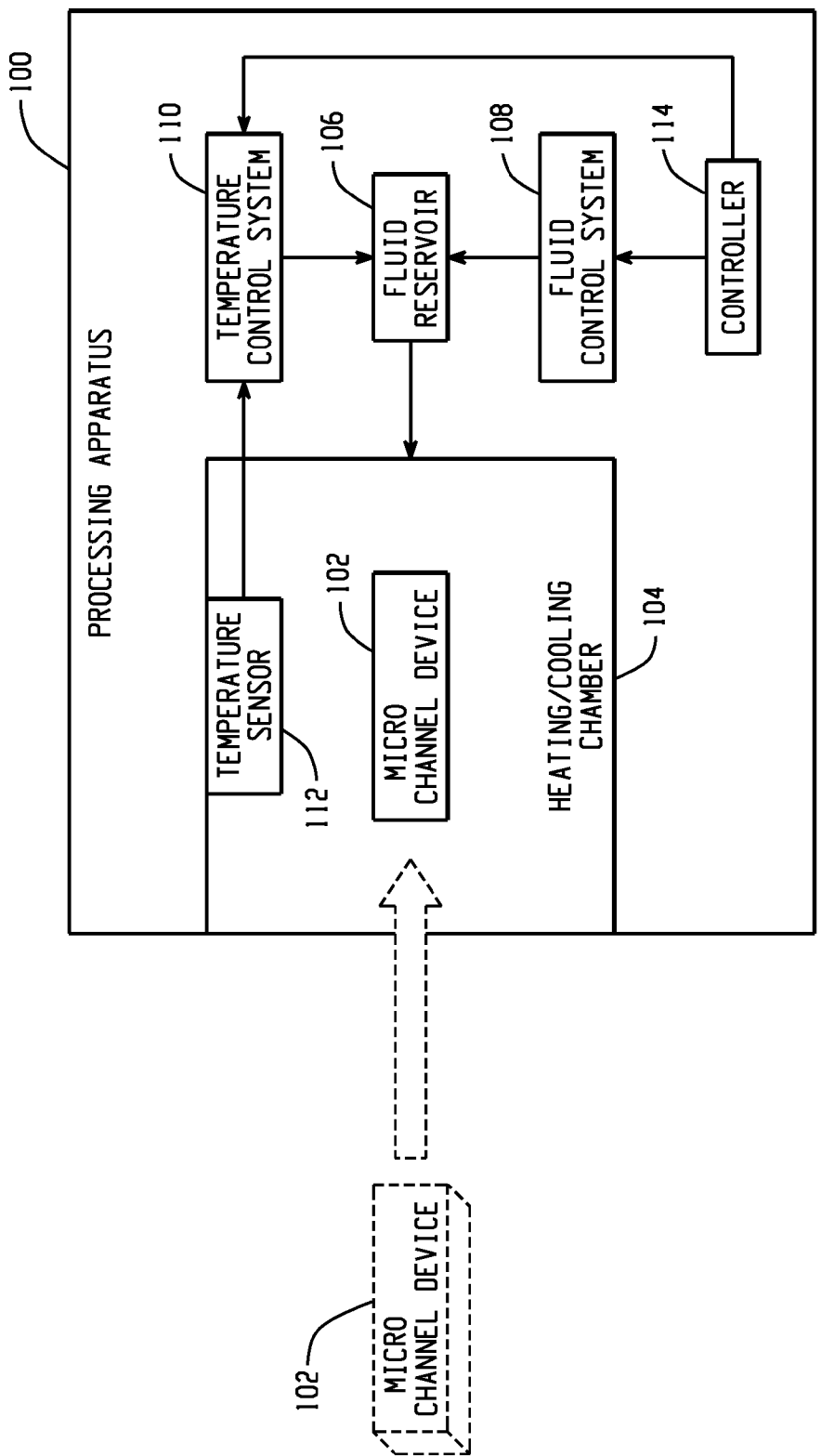
FIG. 1 illustrates an example processing apparatus with a heating/cooling chamber for heating and/or cooling a micro device installed therein.

FIG. 1 illustrates a micro channel device processing apparatus 100 for processing one or more samples located on a micro channel device 102. By way of example, the micro channel device 102 may include a biochip with one or more bio-samples in one or more micro channels of the biochip. In this instance, the processing apparatus 100 may be configured for DNA, enzymatic, protein, and/or other processing and/or analysis of at least one of the one or more bio-samples. In another embodiment, the micro channel device 102 may include a lab-on-a-chip and/or other micro technology carrying a sample for processing, analysis, etc.

The processing apparatus 100 includes a heating/cooling chamber 104 configured to receive the micro channel device 102. In the illustrated embodiment, the heating/cooling chamber 104 receives the entire micro channel device 102. In another embodiment, the heating/cooling chamber 104 is configured to receive only a sub-portion of the micro channel device 102, such as a sub-portion that includes a sample to be processed under a predetermined temperature. The micro channel device 102 is installed into the heating/cooling chamber 104 through an opening in the chamber 104, which can be subsequently closed for processing the device 102. The micro channel device 102 can be removed from the chamber 104 through the opening.

The illustrated heating/cooling chamber 104 is configured to receive a heating/cooling fluid, which comes into thermal contact with the installed micro channel device 102, from a fluid reservoir 106. Suitable heating/cooling fluids include, but are not limited to, a gas such as air, a liquid such as water, antifreeze, etc., and/or other fluid. The heating/cooling chamber 104 is configured to heat and/or cool samples on the micro channel device 102 installed therein via the fluid. In one instance, the heating/cooling chamber 104 is configured to heat and/or cool a sample on such a micro channel device 102 based on a predetermined temperature or temperature range.

By way of non-limiting example, the particular type of processing may be associated with amplifying DNA samples in a bio-sample (e.g., blood, saliva, etc.) via a polymerase chain reaction or otherwise, where the bio-sample needs to be within a particular temperature range for the DNA to be replicated. In this instance, a fluid such as air within a particular temperature range may be moved into the chamber 104. The air circulates about the micro channel device 102 and, through convection, facilitates heating or cooling the sample to within the predetermined temperature range. Other types of processing are also contemplated herein.

The heating/cooling fluid can facilitate heating and/or cooling the sample carried by the micro channel device 102 over various temperature ranges. Examples of suitable temperatures include temperatures in a range of about zero degrees Celsius (0° C.) to about one hundred degrees Celsius (100° C.), such as about fifty degrees Celsius (50° C.), about fifty-nine degrees Celsius (59° C.), about seventy-two degrees Celsius (72° C.), about ninety-five degrees Celsius (95° C.), and/or other temperatures.

A fluid control system 108 controls a flow of the heating/cooling fluid from the fluid reservoir 106. The fluid control system 108 may includes a pressure system (e.g., a pump or the like) or fluid mover (e.g., a blower or the like) and/or one or more other components for controllably moving the fluid into the heating/cooling chamber 104. Such a fluid control system 108 may include Micro Electro Mechanical Systems (MEMS) and/or other micro technology based components. Other fluid control systems are also contemplated herein.

A temperature control system 110 controls a temperature of the heating/cooling fluid in the reservoir 106 and hence the temperature in the heating/cooling chamber 104. The temperature controller 110 may include a temperature servomechanism or other feedback based system, and/or other system for dynamic temperature control. In the illustrated embodiment, a temperature sensor 112 senses a temperature in the heating/cooling chamber and generates a signal indicative thereof. The temperature control system 110 controls the temperature of the heating/cooling fluid based on the feedback signal.

A controller 114 of the processing apparatus 100 controls the fluid control system 108 and the temperature control system 110.

It is to be appreciated that the heating/cooling chamber 104 can be used for relatively fast temperature cycling of a sample carried by the micro device 102, with low thermal mass, high bandwidth control of the flow of the heating/cooling fluid, and/or relatively low power consumption.

FIGS. 2-5 illustrate non-limiting examples of flow of a fluid in the chamber 104. For explanatory purposes, these examples show fluid flow in a two-dimensional plane. However, it is to be understood that the fluid may flow about the micro device 102 in three dimensional space.

Figure 2:
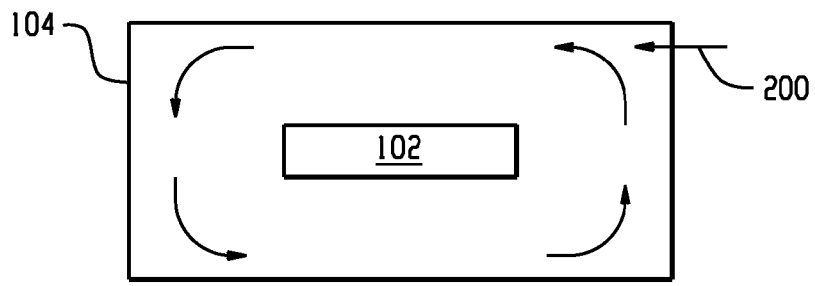
FIGS. 2, 3, 4, and 5 illustrate non-limiting examples of fluid flow in the heating/cooling chamber of the processing apparatus of FIG. 1.

Initially referring to FIG. 2, the fluid control system 108 (FIG. 1) moves a fluid 200 into the heating/cooling chamber 104. In this example, the fluid 200 moved into the chamber 104 circulates about the micro channel device 102 in the chamber 104. Circulating the fluid as such may facilitate creating a substantially uniform temperature in the chamber 104 about the micro channel device 102.

Figure 3:
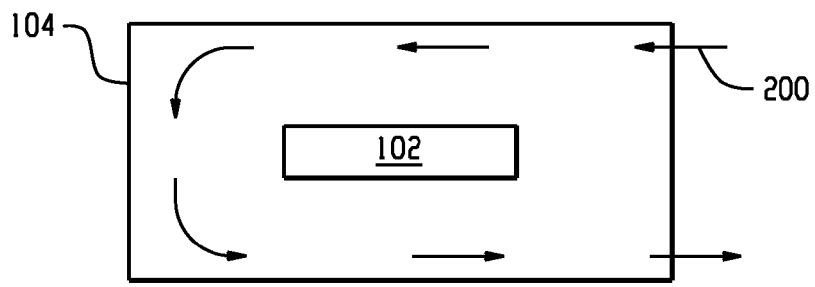

In FIG. 3, the fluid control system 108 (FIG. 1) moves the fluid 200 into the chamber 104 and around the micro channel device 102, and out of the chamber 104 through the same side as the fluid is moved into the chamber 104. The fluid 200 leaving the chamber 104 may be expelled from the processing apparatus 100 or re-circulated, via the fluid control system 108, back into the chamber 104.

Figure 4:
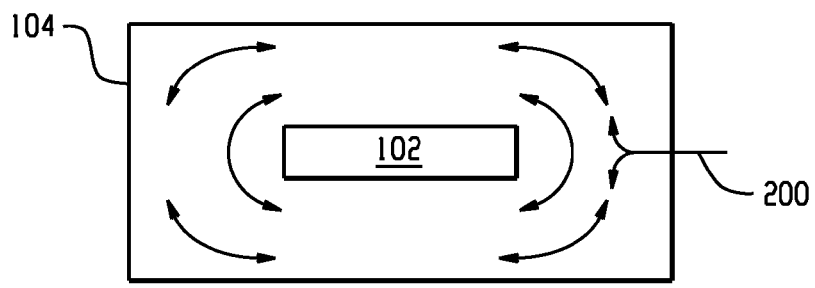

In FIG. 4, the fluid control system 108 (FIG. 1) moves the fluid 200 over multiple sides of the micro channel device 102. Likewise, moving the fluid as such may facilitate creating a substantially uniform temperature in the chamber 104 about the micro channel device 102

Figure 5:
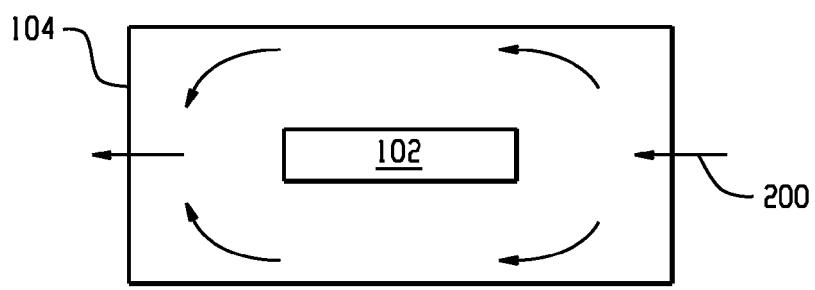

In FIG. 5, the fluid control system 108 (FIG. 1) moves the fluid 200 into the chamber 104 through one side of the chamber 104 and the fluid 200 is expelled from the chamber 104 through a different side of the chamber 104.

A combination of one or more of the embodiments of FIGS. 2-5 and/or other embodiments are also contemplated herein.

Figure 6:
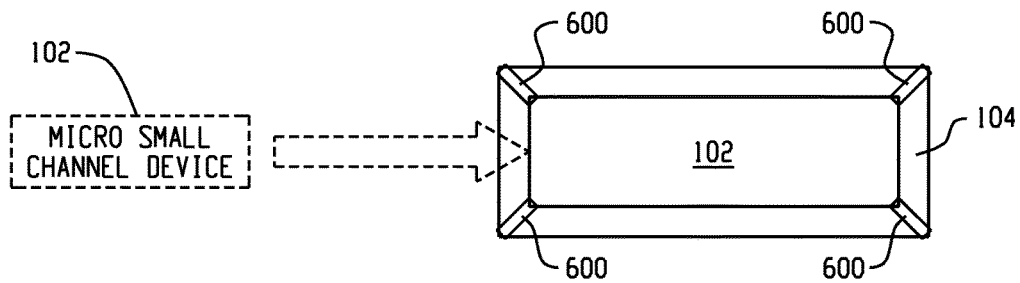
FIGS. 6 and 7 illustrate non-limiting examples of carrying the micro device in the heating/cooling chamber of the processing apparatus of FIG. 1.
Figure 7:
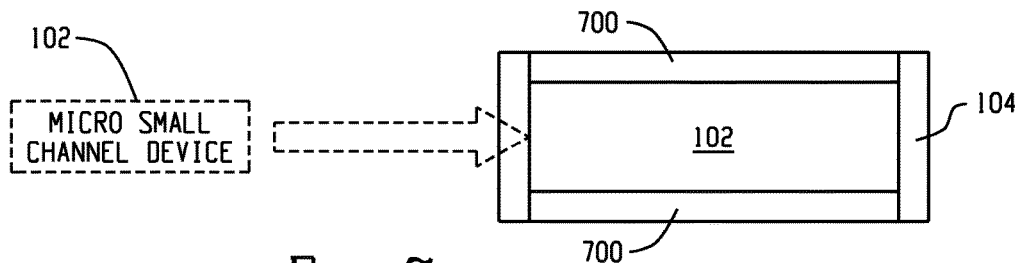

FIGS. 6 and 7 illustrate non-limiting examples for carrying the micro channel device 102 in the heating/cooling chamber 104 of the processing apparatus 100.

Initially referring to FIG. 6, one or more supports 600 in the heating/cooling chamber 104 support one or more corners of the micro device 102. This technique allows the fluid to be circulated about the top, the bottom, and the sides of the micro device 102.

In FIG. 7, one or more supports 700 in the heating/cooling chamber 104 support one or more sides of the micro device 102. This technique physically contacts a greater area of the micro device 102 relative to the embodiment of FIG. 6.

A combination of the supports 600 and 700 and/or other supports are also contemplated herein. In one instance, the surface area of the micro channel device 102 in contact with the supports is minimized, thereby maximizing the surface area in thermal communication with the fluid in the chamber 104.

It is to be appreciated that the relative geometry (e.g., shape, size, etc.) of the components (e.g., the chamber 104, the device 102, the supports 600 and 700, etc.) herein are provided for explanatory purposes and are not limiting. Other geometries are also contemplated herein.

Figure 8:
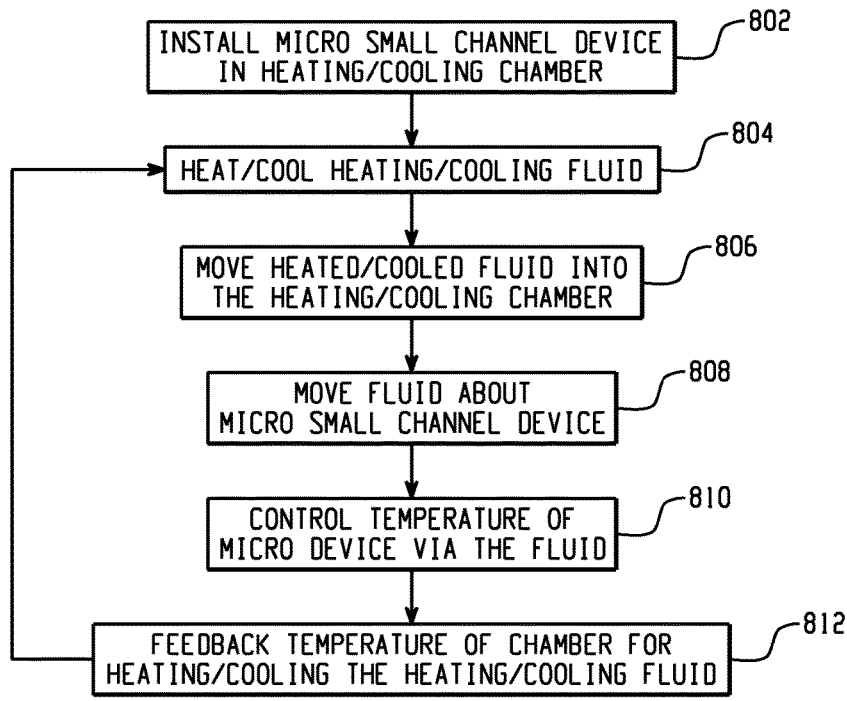
FIG. 8 illustrates a method of heating/cooling a micro channel device installed in the heating/cooling chamber of the processing apparatus of FIG. 1.

FIG. 8 illustrates a method of heating/cooling a micro channel device installed in the heating/cooling chamber of the processing apparatus 100.

It is to be appreciated that the ordering of the followings acts is not limiting. For example, one or more of the acts may occur in a different order, including concurrently with one or more acts. In addition, one or more of the following acts may be omitted and/or one or more other acts may additionally or alternatively be included.

At 802, at least a sub-portion of the micro channel device 102 is installed in the heating/cooling chamber 104 of the processing apparatus 100.

At 804, the temperature controller 110 controls a temperature of a fluid in the fluid reservoir 106. As described herein, the temperature of the fluid is controlled based on a predetermined temperature range and a feedback signal indicative of a temperature of the micro channel device 102 and/or a micro channel thereof.

At 806, the fluid control system 108 controls a flow of the heated/cooled fluid into the heating/cooling chamber 104.

At 808, the fluid flows about the micro channel device 102.

At 810, the fluid heats or cools the micro channel device 102. In one instance, this includes heating or cooling a fluid in a micro channel of the micro channel device 102.

At 812, a temperature in the chamber 104 is sensed and fed back to the temperature control system 110.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A micro channel device processing apparatus, comprising:
   a heating/cooling chamber configured to receive a micro channel device, wherein the heating/cooling chamber includes multiple sides and receives an entirety of the micro channel device on a support inside of all of the multiple sides;
   an inlet and an outlet, wherein the inlet and outlet are located on a same side of the heating/cooling chamber; and
   a fluid control system that controls a flow of a heating/cooling fluid in the chamber,
   wherein the fluid control system controls the temperature of the micro channel device by introducing and circulating a fluid in the heating/cooling chamber relative to the micro channel device such that the fluid enters the heating/cooling chamber from the same side of the multiple sides in a first direction, flows along only a first side of the micro channel device in the heating/cooling chamber in the first direction, flows around an end of the micro channel device and into a second direction, flows along only a second opposing side of the micro channel device in the second direction, and exits the heating/cooling chamber from the same side of the multiple sides in the second direction which is opposite the first direction, wherein the first and second sides are on opposites side of the micro channel device.

2. The apparatus of claim 1, wherein the fluid is a gas with a temperature within a predetermined temperature range.

3. The apparatus of claim 1, wherein the fluid is air with a temperature within a predetermined temperature range.

4. The apparatus of claim 1, wherein the fluid heats or cools the micro channel device, thereby heating or cooling a sample fluid carried by the micro channel device.

5. The apparatus of claim 1, further comprising:
   a temperature control system that controls a temperature of the heating/cooling fluid.

6. The apparatus of claim 5, wherein the temperature control system controls the temperature based on a predetermined temperature range.

7. The apparatus of claim 6, wherein the predetermined temperature range corresponds to a processing temperature of a sample carried by the micro channel device.

8. The apparatus of claim 1, the fluid control system, comprising:
   a fluid mover that moves the fluid into the chamber.

9. The apparatus of claim 1, further comprising:
   a temperature sensor that generates a signal indicative of a temperature in the chamber.

10. The apparatus of claim 9, further comprising:
    a temperature control system that controls a temperature of the heating/cooling fluid based on the signal.

11. The apparatus of claim 1, wherein the micro channel device includes a biochip.

12. The apparatus of claim 11, wherein the biochip includes at least one region configured for DNA analysis.

13. The apparatus of claim 12, wherein the fluid control system controls a temperature of the at least one region and a sample carried thereby via the heating/cooling fluid.

14. A method, comprising:
    controlling a temperature of a sample carried by a micro channel device installed on a support entirely in a heating/cooling chamber of a micro channel device processing apparatus by circulating a fluid relative to the micro channel device in the heating/cooling chamber such that the fluid traverses in a first direction over only a first side of the micro channel device in the heating/cooling chamber, circles around a second side of the micro channel device, traverses in a second opposing direction over only a third side of the micro channel device in the heating/cooling chamber that opposes the first side, and returns to a same side of the heating/cooling chamber at which the fluid was introduced into the heating/cooling chamber, wherein the fluid is introduced into the heating/cooling chamber and exits the heating/cooling chamber through the same side of the heating/cooling chamber in opposing directions.

15. The method of claim 14, further comprising:
    controlling a temperature of a heating/cooling fluid;
    controlling a flow of the heating/cooling fluid into the chamber; and
    controlling the temperature of the sample via the heating/cooling fluid.

16. The method of claim 15, further comprising:
    controlling the temperature of the heating/cooling fluid based on a predetermined temperature range corresponding to a processing temperature of the sample.

17. The method of claim 16, further comprising:
    sensing a temperature in the chamber;
    generating a signal indicative of the sensed temperature; and
    controlling the temperature of the heating/cooling fluid based on the signal.

18. The method of claim 15, wherein the fluid is air.

19. The method of claim 15, wherein the fluid is introduced into the heating/cooling chamber through an inlet and exits the heating/cooling chamber through only a single outlet.

20. A micro channel device processing apparatus, comprising:
    a heating/cooling chamber configured to receive an entirety of a micro channel device carrying a sample on a support inside of the heating/cooling chamber;
    an inlet and an outlet, wherein the inlet and outlet are located on a same side of the heating/cooling chamber; and
    means for controlling a temperature of the sample in the chamber by circulating a fluid relative to the micro channel device in the heating/cooling chamber such that the fluid traverses in a first direction and physically contacts only a first side of the micro channel device in the heating/cooling chamber, circles around a second side of the micro channel device, and traverses in a second opposing direction and physically contacts only a third side of the micro channel device in the heating/cooling chamber, returning to a side of the heating/cooling chamber at which the fluid was introduced into the heating/cooling chamber and exiting out of the side of the heating/cooling chamber in an opposing direction as the fluid was introduced.

* * * * *